(12) United States Patent
Morgan et al.

(10) Patent No.: US 9,885,421 B2
(45) Date of Patent: Feb. 6, 2018

(54) HIGH CYCLE AND SPEED VALVE

(71) Applicant: Parker-Hannifin Corporation, Cleveland, OH (US)

(72) Inventors: Daniel P. Morgan, Vacaville, CA (US); Thomas A. Austin, Occidental, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/914,778

(22) PCT Filed: Aug. 26, 2013

(86) PCT No.: PCT/US2013/056621
§ 371 (c)(1),
(2) Date: Feb. 26, 2016

(87) PCT Pub. No.: WO2015/030706
PCT Pub. Date: Mar. 5, 2015

(65) Prior Publication Data
US 2016/0201820 A1 Jul. 14, 2016

(51) Int. Cl.
*F16K 7/17* (2006.01)
*F16K 7/14* (2006.01)
(Continued)

(52) U.S. Cl.
CPC .............. *F16K 7/17* (2013.01); *F16K 7/14* (2013.01); *F16K 25/005* (2013.01); *F16K 25/04* (2013.01); *F16K 31/12* (2013.01); *F16K 7/16* (2013.01)

(58) Field of Classification Search
CPC ... F16K 7/16; F16K 31/12; F16K 7/14; F16K 25/04; F16K 7/17; F16K 25/005; F16K 27/0272; Y10T 137/7036
(Continued)

(56) References Cited

U.S. PATENT DOCUMENTS 2,551,413 A * 5/1951 Booe .................. C22C 5/06
205/170
3,870,607 A * 3/1975 Bardach .............. C25D 7/10
205/122
(Continued)

FOREIGN PATENT DOCUMENTS

EP 1 300 619 A1 4/2003
EP 1 323 964 A2 7/2003
(Continued)

OTHER PUBLICATIONS

International Search Report and Written Opinion for corresponding International Application No. PCT/US2013/056621 dated May 21, 2014.
(Continued)

*Primary Examiner* — John Bastianelli
(74) *Attorney, Agent, or Firm* — Renner, Otto, Boisselle & Sklar, LLP

(57) ABSTRACT

A high cycle and speed valve (10) includes a body (12), a valve seat (20) fixed within the body, and a diaphragm (24) that moves between a closed position in which the diaphragm is forced against the valve seat, and an open position in which the diaphragm is released from the valve seat. The valve seat includes a static section (40) that is secured within the body, and a dynamic section (42) that is compressed by the diaphragm when the diaphragm is in the closed position. The static section includes a radially extending flange (44) that is received in a recess (46) formed in the body to secure the static section in the body. The valve includes a body cavity relief space (52) into which the dynamic section compresses in the closed position. The valve further includes a cap (26) that has a dry film lubricant layer (58) that serves as a dry lubricant between the cap and the diaphragm.

15 Claims, 6 Drawing Sheets

(51) Int. Cl.
*F16K 31/12* (2006.01)
*F16K 25/00* (2006.01)
*F16K 25/04* (2006.01)
*F16K 7/16* (2006.01)

(58) Field of Classification Search
USPC ............. 251/331, 335.2, 359–365, 333–334; 137/375
See application file for complete search history.

(56) References Cited

U.S. PATENT DOCUMENTS

| | | | | | |
|---|---|---|---|---|---|
| 4,744,572 | A | * | 5/1988 | Sahba | F16K 1/2266 251/174 |
| 5,131,627 | A | * | 7/1992 | Kolenc | F16K 41/12 251/331 |
| 5,295,660 | A | * | 3/1994 | Honma | F16K 35/00 251/331 |
| 5,335,691 | A | * | 8/1994 | Kolenc | F16K 7/12 251/331 |
| 5,725,007 | A | * | 3/1998 | Stubbs | F16K 41/12 251/359 |
| 6,092,550 | A | * | 7/2000 | Gotch | F16K 7/16 137/331 |
| 6,871,803 | B1 | * | 3/2005 | Ohmi | F16K 7/14 239/533.3 |
| 7,686,280 | B2 | * | 3/2010 | Lowery | F16K 7/14 251/331 |
| 8,172,197 | B2 | * | 5/2012 | Gu | F16K 7/17 251/331 |
| 2009/0065725 | A1 | | 3/2009 | Lenherr | |
| 2009/0081477 | A1 | | 3/2009 | Kobayashi | |
| 2010/0270490 | A1 | * | 10/2010 | Roper | G05D 16/0661 251/337 |
| 2012/0097881 | A1 | * | 4/2012 | Aoyama | F16K 1/425 251/359 |

FOREIGN PATENT DOCUMENTS

| | | |
|---|---|---|
| JP | SHO 56-15474 U1 | 2/1981 |
| JP | 4-102283 | 4/1992 |
| JP | HEI 6-94142 | 4/1994 |
| JP | 2002-513457 | 5/2002 |
| JP | 2007-509291 | 4/2007 |
| JP | 2007-280945 | 10/2007 |
| JP | 2008-128278 | 6/2008 |
| JP | 2009-068706 | 4/2009 |
| WO | 98/34056 | 8/1998 |
| WO | 2005/038320 A2 | 4/2005 |

OTHER PUBLICATIONS

International Preliminary Report on Patentability for corresponding International Application No. PCT/US2013/056621 dated Dec. 3, 2015.
Office Action for corresponding Japanese Patent Application No. 2016-538899 dated Jul. 13, 2017.

* cited by examiner

HIGH CYCLE AND SPEED VALVE

This application is a national phase of International Application No. PCT/US2013/056621 filed Aug. 26, 2013 and published in the English language.

FIELD OF THE INVENTION

The present invention is directed to high cycle and speed (HCS) valves, and particularly HCS valves including a pneumatically operated diaphragm that is actuated for high cycle rates for relatively low pressure operations.

BACKGROUND OF THE INVENTION

The High Cycle and Speed (HCS) valve is a pneumatically operated diaphragm valve for the Ultra High Purity (UHP) market. UHP valves are used, for example, in the manufacture of semiconductors in a process known as Atomic Layer Deposition (ALD). The gases used in ALD processes need to be free of impurities, which would compromise the function of the resultant semiconductors. ALD valves are required to open and close rapidly with a closing force of around 70 pounds of pressure. Pneumatic actuators generally are used to operate these valves because a pneumatic actuator can provide the requisite large closing force in a compact package, while being free of the kind of flammability risks associated with electronic solenoid-operated valves. ALD valves are required to perform many actuation cycles in a short period of time, typically having a response time below 20 milliseconds. Such rapid response time and related high cycling renders manual valves impractical, and pneumatically actuated valves are therefore preferred.

One measure of valve life, and thus valve reliability, is referred to in the art as the Mean Time To Failure (MTTF). MTTF typically is denoted as the number of cycles to valve failure. Conventional HCS valves have achieved MTTF measures on the order of one million cycles. Given the high cycling of HCS valves, however, such as in ALD processes, even a one million cycle MTTF significantly constrains the useful life of such valves. The need for frequent valve replacement or repair remains a substantial performance issue for HCS valves, particularly in ALD and comparable processes.

One source of potential HCS valve failure is valve seat wear. When the valve is in the closed position, the portion of the valve seat that contacts the diaphragm compresses slightly under the force of the diaphragm when the valve is closed to provide an effective sealing surface. Otherwise, the valve seat is substantially rigid and generally considered non-moving in a gross sense. It is known, however, that in actuality there indeed tends to be slight movement and displacement of the valve seat relative to the adjacent valve components that house the valve seat. In particular, high gas pressure from the inlet side of the valve tends to move the valve seat out of position. For example, in conventional HCS valves for ALD processes, valve seat movement tends to be on the order of 0.001 inches per cycle. Such repeated displacement is sufficient to damage the valve over time, for as the valve seat moves against adjacent valve components, the friction causes valve seat wear to occur. The valve seat wear results in leakage space being present even when the valve is closed, which permits external leakage of the fluids flowing through the valve. With the high cycling of HCS valves, even the slight movement of the valve seat accumulates significant valve seat wear that diminishes the valve life.

Another source of potential HCS valve failure is fatigue failure of the diaphragm that results in the valve being unable to close fully. This also can result is external leakage of the fluids flowing through the valve. Many HCS valve components, including the diaphragm and associated cap against which the diaphragm presses, are made of rigid metal materials such as, for example, stainless steel. The rubbing of the metal diaphragm against adjacent metal components (e.g., against the valve cap or again another stainless steel diaphragm in a multi-diaphragm configuration) leads to damaging wear of the diaphragm. This type of wear caused by the rubbing of adjacent metal surfaces commonly is referred to in the art as "fretting". The fretting also may occur unevenly across the diaphragm, and where the fretting is concentrated cracks can occur in the diaphragm.

In view of both valve seat wear and diaphragm fretting, the reliability and valve life, as measured for example by the MTTF, has proven to be deficient for high cycling applications.

SUMMARY OF THE INVENTION

In view of the above deficiencies of conventional HCS valves, there is a need in the art for an improved HCS valve having enhanced valve life and reliability, and a higher MTTF in particular. The present invention is a high cycle and speed valve having enhanced valve life and reliability due to a configuration that significantly reduces both the valve seat wear and diaphragm fretting that commonly cause valve failure in conventional configurations.

In exemplary embodiments, an HCS valve includes a non-wearing valve seat in which the valve seat is separated into a lower static section and an upper dynamic section. The lower static section performs a seat retention function, which prevents seat movement and experiences insignificant or immeasurable deformation during valve seat compression. The HCS valve further is configured such that the upper dynamic section of the valve seat, now independent from seat retention requirements, has adequate clearance between the valve seat and valve body to permit compression of the upper dynamic section during the sealing process without the upper section coming into significant contact with the valve body. This essentially eliminates the friction and resultant valve seat wear and the associated failure modes.

In further exemplary embodiments, the HCS valve includes a non-fretting diaphragm configuration. The HCS valve includes only a single diaphragm, which avoids fretting caused by adjacent diaphragms rubbing against each other. In addition, a dry film lubricant is applied between the diaphragm and the valve cap. The dry film lubricant may be a silver plating coated onto the surface of the valve cap that comes in contact with the diaphragm.

Accordingly, aspects of the invention include a high cycle and speed (HCS) valve. In exemplary embodiments, the HCS valve includes a body, a valve seat fixed within the body, and a diaphragm that moves between a closed position in which a first surface of the diaphragm is forced against the valve seat, and an open position in which the first surface of the diaphragm is released from the valve seat. The valve seat includes a static section that is secured within the body, and a dynamic section that is compressed by the diaphragm when the diaphragm is in the closed position. The static section of the valve seat may include a base and a flange that extends radially outward from the base, and the body has a recess that receives the flange to retain the static section of the valve seat within the body. In addition, when the diaphragm is in the open position, the dynamic section of the valve seat and the body define a body cavity relief space, and when the diaphragm is in the closed position, the dynamic section of the valve seat compresses to fill at least in part the body cavity relief space.

In exemplary embodiments, the HCS valve includes a cap that has a contact surface that contacts at least a portion of a second surface of the diaphragm opposite the first surface of the diaphragm. The contact surface of the cap has a dry film lubricant layer that serves as a dry lubricant between the cap and the second surface of the diaphragm. The dry film lubricant layer may be a silver plating that is applied as a coating layer on the contact surface of the cap. The high cycle and speed valve further has only one diaphragm.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
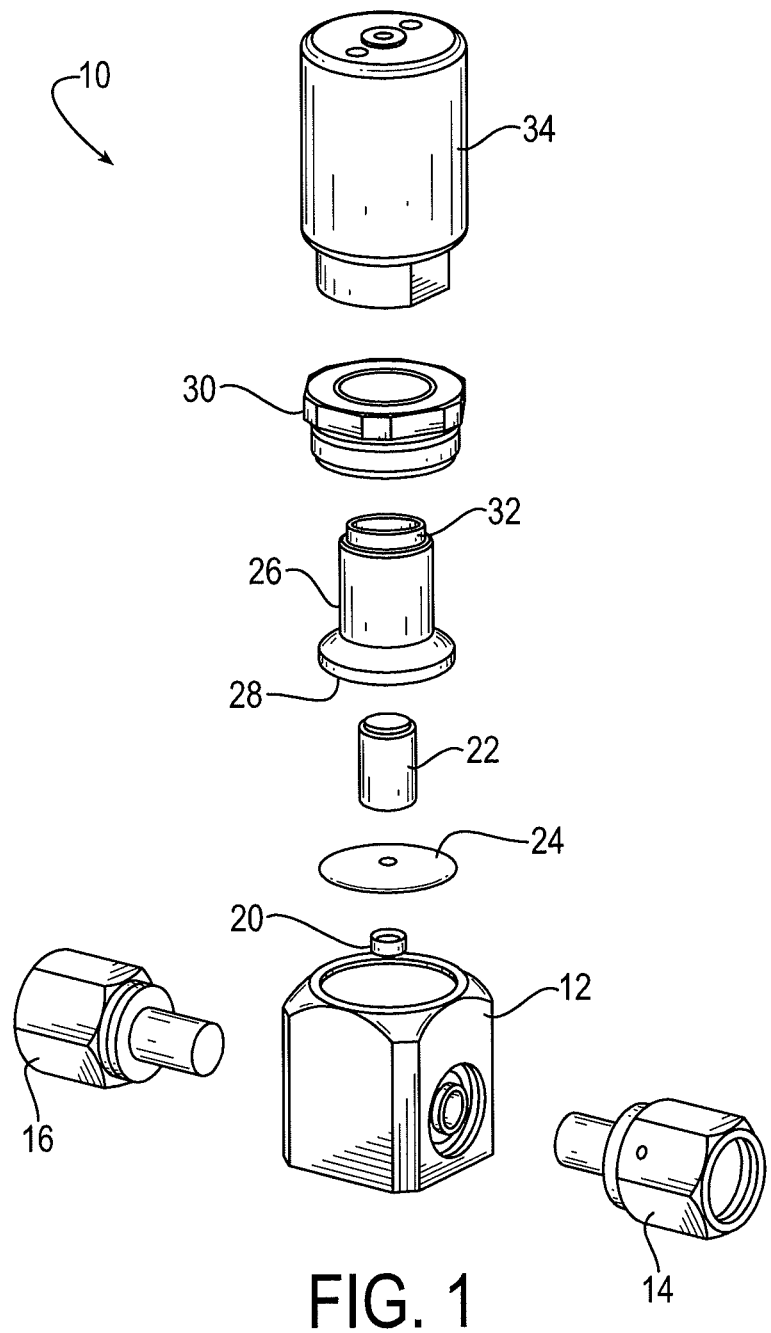
FIG. 1 is a schematic diagram that depicts an exploded isometric view of an exemplary high cycle and speed (HCS) valve in accordance with embodiments of the present invention.

Embodiments of the present invention will now be described with reference to the drawings, wherein like reference numerals are used to refer to like elements throughout. It will be understood that the figures are not necessarily to scale.

Figure 2:
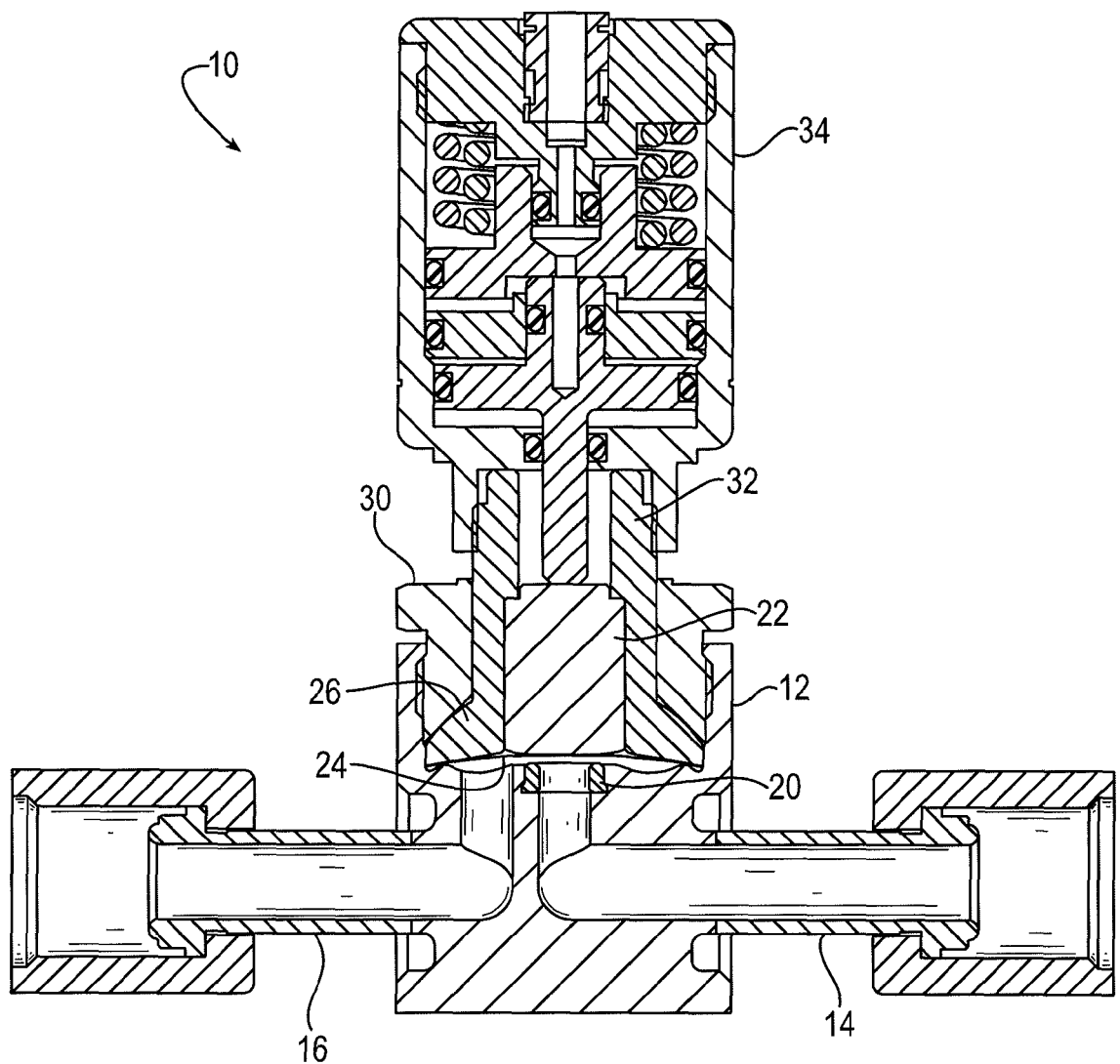
FIG. 2 is a schematic diagram that depicts a side cross-sectional view of an exemplary HCS valve in accordance with embodiments of the present invention.

FIG. 1 is a schematic diagram that depicts an exploded isometric view of an exemplary high cycle and speed (HCS) valve 10 in accordance with embodiments of the present invention. FIG. 2 is a schematic diagram that depicts a side cross-sectional view of an exemplary HCS valve 10 comparable to the HCS valve depicted in FIG. 1. Like components are therefore identified by common reference numerals in FIGS. 1 and 2.

The HCS valve 10 includes a body 12 that acts as a housing to secure the other valve components. Fluid interfaces 14 and 16 respectively provide a fluid inlet and outlet for fluids that may pass through the valve 10. The fluid interfaces 14 and 16 may include any suitable glands, fittings, and comparable components for attaching to the HCS valve 10 to appropriate fluid sources and for providing a fluid flow pathway. For example, the fluids being utilized may be gases associated with ALD processing as are known in the art. In the example of FIGS. 1 and 2, when the HCS valve is open the fluids flows from the inlet fluid interface 14, through the internal components of the HCS valve 10 as further described below, and outward through the outlet fluid interface 16.

The HCS valve 10 further includes a valve seat 20 and a button 22, separated by a diaphragm 24. As seen particularly in the cross-sectional view of FIG. 2, a cap 26 surrounds the button 22 and has a contact surface 28 that comes in contact with the diaphragm 24 outside of the diameter of the button 22. A clamp nut 30 acts as a securing nut for retaining the cap and button within the body 12. For example, the body 12 and clamp nut 30 may include opposite cooperating threads to secure the body 12 to the clamp nut 30. An upper end 32 of the cap 26 extends beyond the clamp nut 30. An actuator assembly 34 is secured to the upper end 32 of the cap 26. For example, the upper end 32 of the cap 26 and the actuator assembly 34 may include opposite cooperating threads to secure the actuator to the upper end of the cap. Actuator assemblies are known in the art. In exemplary embodiments, the actuator assembly 34 is a pneumatic actuator assembly that is suitable for high cycle and speed applications, such as, for example, ALD processing in semiconductor manufacturing and comparable processes.

The valve components may be manufactured of any suitable materials as are known in the art. For example, the body, diaphragm, button, cap, and clamp nut may be machined from a variety of hardened metallic materials, and stainless steel in particular. The diaphragm also may be fabricated from high strength metal alloys. The valve seat may be machined from a rigid or semi-rigid plastic material, such as Polychlorotrifluoroethylene (PCTFE) or similar thermoplastic materials. The material of valve seat is selected so as to permit a degree of compression under the force of the diaphragm, as described above when the valve is closed, to provide an effective sealing surface. It will be appreciated that the described materials are examples, and any suitable materials may be employed for the valve components.

The HCS valve generally operates as follows. The pneumatic actuator 34 operates to open and close the valve. Associated with the actuator 34, there may be sensing elements and related control electronics (not shown) that control when the valve is to be open and closed as required for a given application. In the closed position, the actuator 34 operates to force the button downward against a top surface of the diaphragm. This in turn forces the diaphragm against the valve seat to close the valve, such that a bottom surface of the diaphragm compresses against an upper portion of the valve seat. It will be appreciated that the references to top and bottom surfaces are relative to the example of FIGS. 1 and 2, but it will be appreciated that the valve may be orientated in any manner. When opening the valve, the button is moved upward by the actuator. The diaphragm may be biased upward as well such that the valve releases upward from the valve seat as the button moves upward. Because of the required high cycling, however, in exemplary embodiments a passive bias of the diaphragm is not utilized. Rather, the top surface of the diaphragm may be adhered to the button such that the button actively pulls the diaphragm from the valve seat to open the valve.

Figure 3:
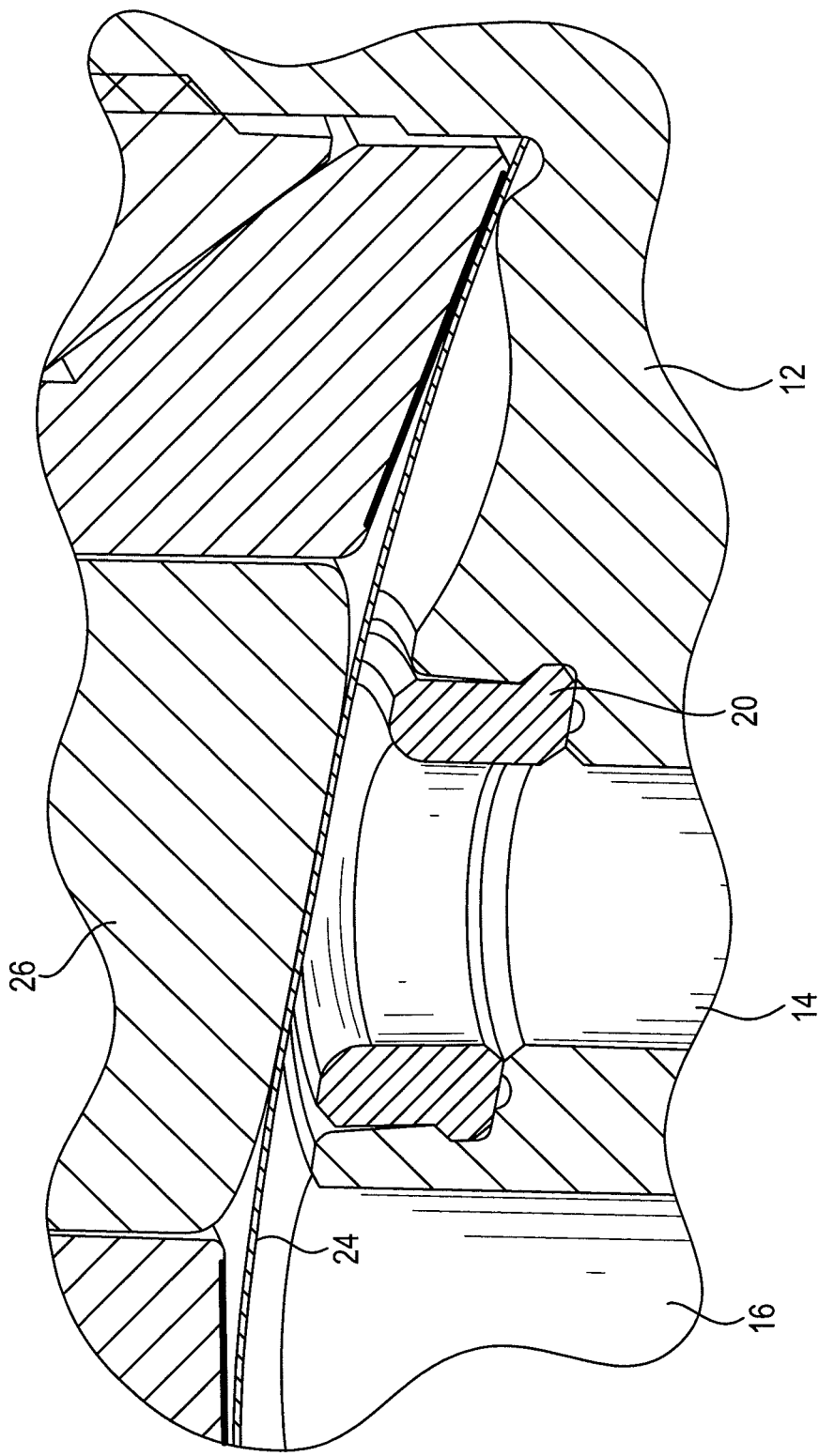
FIG. 3 is a schematic diagram that depicts an isometric view of a portion of an exemplary HCS valve in the vicinity of the valve seat.
Figure 4:
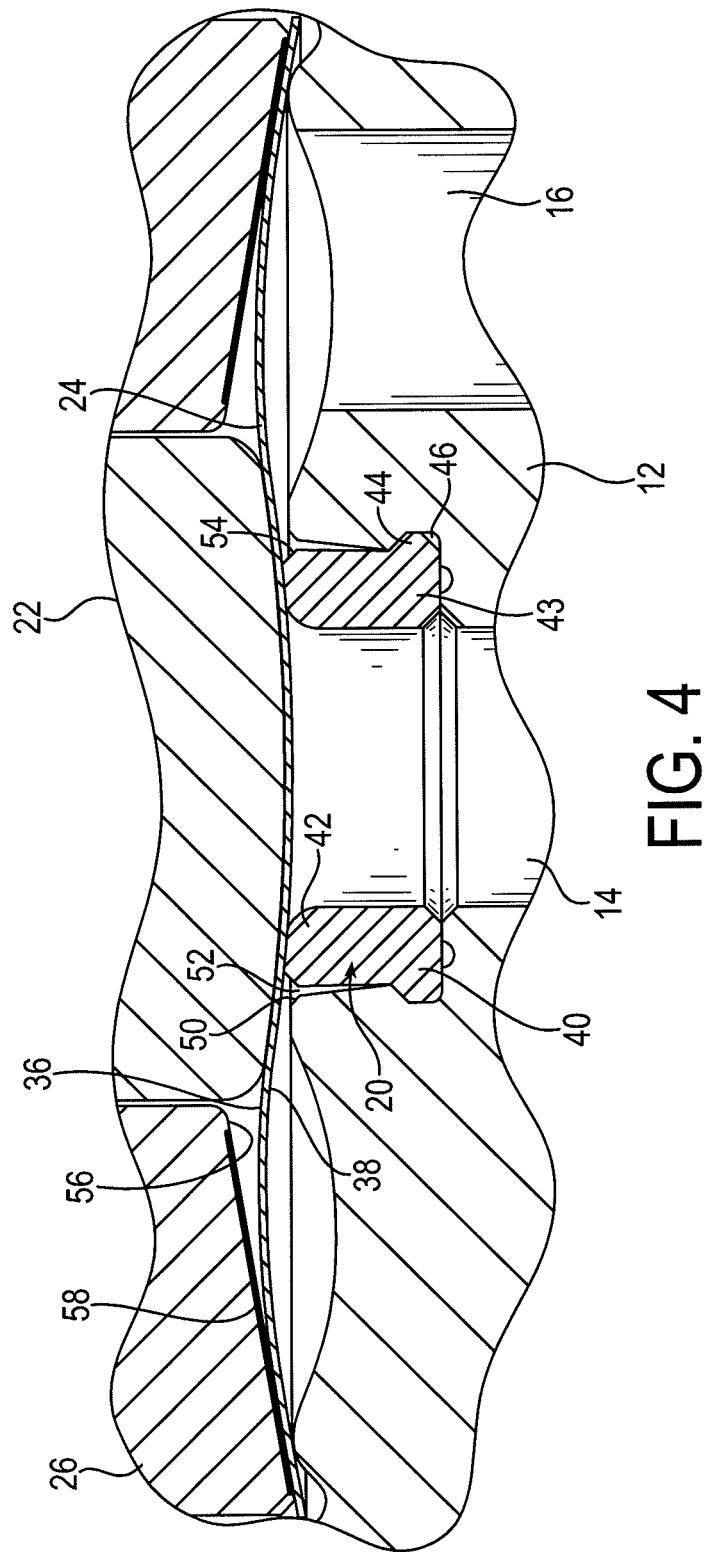
FIG. 4 is a schematic diagram that depicts a side cross-sectional view of an exemplary HCS valve portion in the vicinity of the valve seat, with the valve in a valve closed position.
Figure 5:
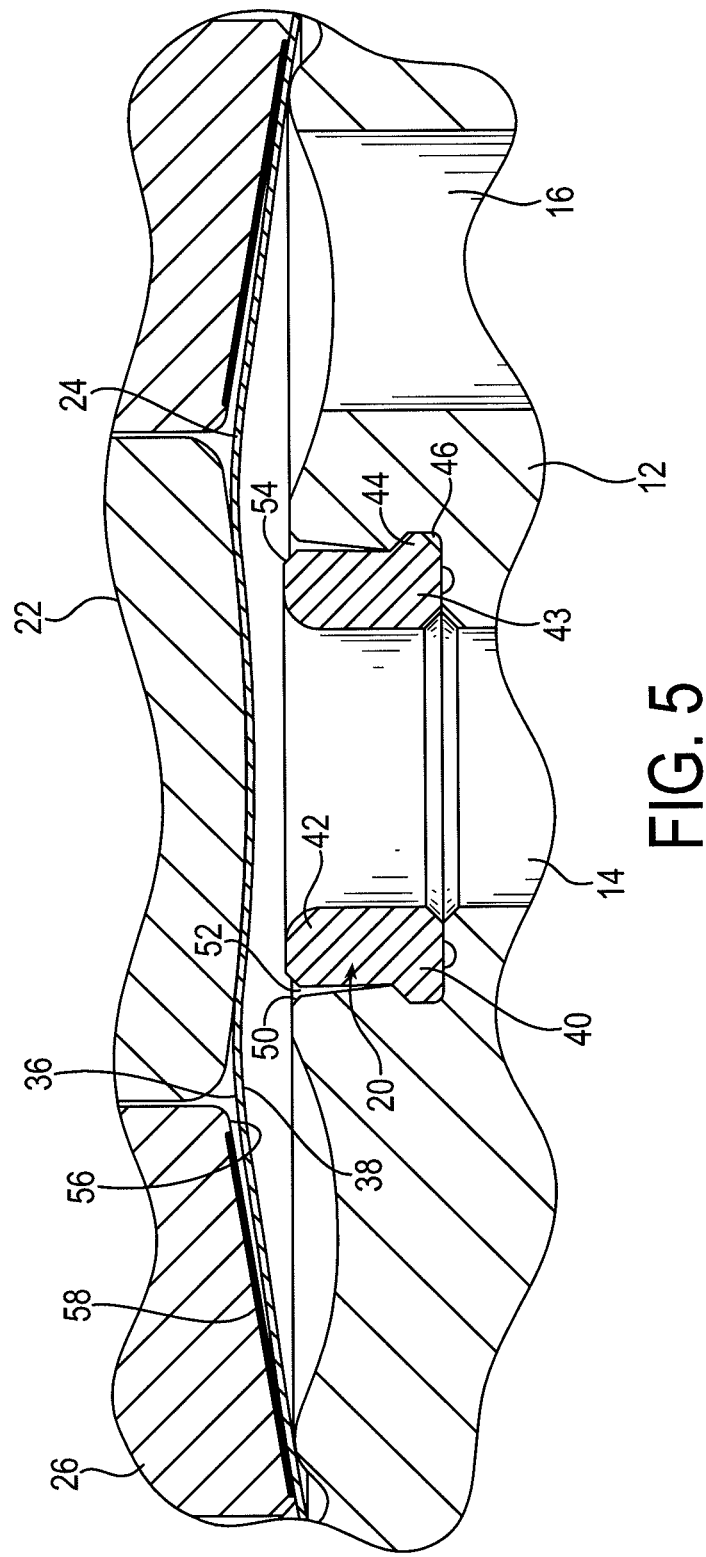
FIG. 5 is a schematic diagram that depicts the HCS valve portion of FIG. 4, with the valve in a valve open position.
Figure 6:
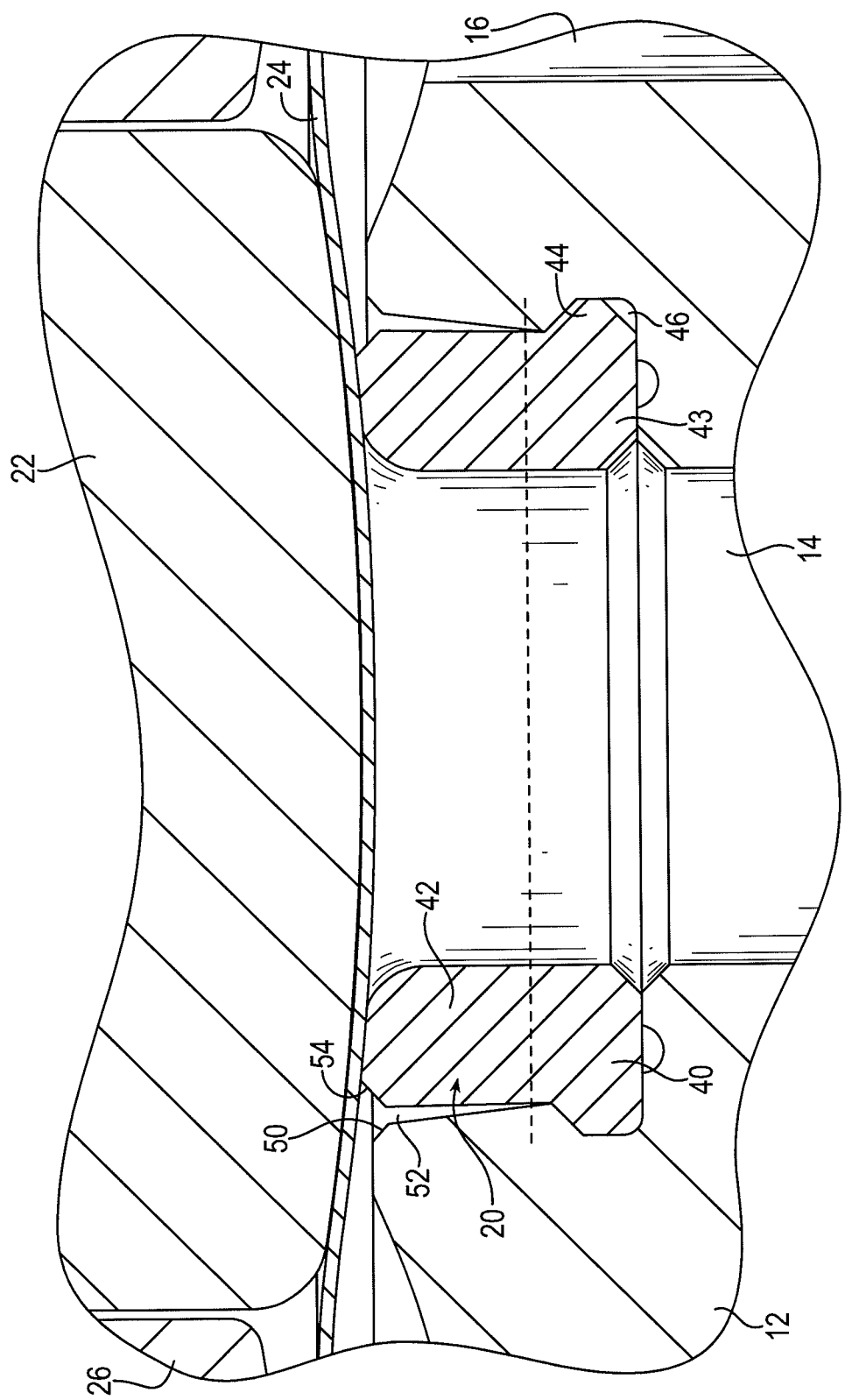
FIG. 6 is a schematic diagram that depicts a closer view of the side cross-sectional view of FIG. 4 in the vicinity of the valve seat, with the valve in the valve closed position.

FIG. 3 is a schematic diagram that depicts an isometric view of a portion of an exemplary HCS valve in the vicinity of the valve seat. FIG. 4 is a schematic diagram that depicts a side cross-sectional view of an exemplary HCS valve portion in the vicinity of the valve seat, with the valve in a valve closed position. FIG. 5 is a schematic diagram that depicts the HCS valve portion of FIG. 4, with the valve in a valve open position. FIG. 6 is a schematic diagram that depicts a closer view of the side cross-sectional view of FIG. 4 in the vicinity of the valve seat, with the valve in the valve closed position. Like components are identified with common reference numerals in FIGS. 3-6 as in FIGS. 1 and 2.

Referring initially to FIG. 3, the valve seat 20 is shown in cross section. The valve seat in total is an annular component that extends around an upper end of the first or inlet fluid interface 14 that provides a flow path into the valve structure, which when the valve is open is in fluid communication with the outlet fluid interface 16. The valve seat is fixed within the body 12 as described in more detail below. The diaphragm 24 is compressed against the valve seat 20 below the end of the cap 26.

Generally, in exemplary embodiments, the HCS valve includes the body, the valve seat fixed within the body, and the diaphragm that moves between a closed position in which a first surface of the diaphragm is forced against the valve seat, and an open position in which the first surface of the diaphragm is released from the valve seat. The valve seat includes a static section that is secured within the body, and a dynamic section that is compressed by the diaphragm when the diaphragm is in the closed position.

Reference is now made to the cross-sectional diagrams of FIGS. 4-6. The various components of the depicted HCS valve portion are labeled in FIGS. 4-6 comparably as in FIGS. 1-3, including the body 12, inlet fluid interface 14 that provides an inlet to the valve, outlet fluid interface 16, valve seat 20, button 22, diaphragm 24, and cap 26. As referenced above, as seen in the valve closed position of FIGS. 4 and 6, the button has been forced downward against at least a portion of a first (top) surface 36 of the diaphragm, which has forced at least a portion of a second (bottom) surface 38 of the diaphragm against the valve seat to close the valve. Again, references to top and bottom surfaces are relative to the example of the figures, but it will be appreciated that the valve may be orientated in any manner, with the first surface being forced against and releasing from the valve seat, and the second surface being opposite the first surface and facing the cap and button. As seen in the valve open position of FIG. 5, the button has been moved upward and the diaphragm commensurately releases upward from the valve seat with the upward movement of the button. In this open position, fluid can move through the inlet fluid interface 14 and through the portion of the flow path defined by the valve seat, and down through the outlet fluid interface 16.

As seen in FIGS. 4-6, the valve seat 20 includes a first static section 40 and a second dynamic section 42. In this example, the dynamic section is the upper section of the valve seat and the static section is the lower section of the valve seat, but the generally orientation of the valve may be varied.

The specific portions of the valve seat are best seen in the closer view of FIG. 6. In such figure, the dotted line represents an imaginary and approximate boundary between the static section 40 and the dynamic section 42 of the valve seat 20. It will be appreciated that the valve seat 20 is a continuous and unitary piece. Accordingly, the boundary line represents more of an illustrative construct rather than an exact division between the two sections of the valve seat. In exemplary embodiments, the static section 40 of the valve seat includes a base 43 and a flange 44 that extends radially outward from the base of the valve seat. The body is formed with a cooperating recess or cavity 46 that receives the flange 44 such that the flange 44 fits into the recess 46. The cooperation of the flange 44 within the recess 46 retains the valve seat in position against upward forces due to high outlet pressure, which might otherwise cause the seat to move out of position, or "float" as occurs in conventional configurations. The flange 44 and the corresponding cavity 46 on the body 12 thus specifically are configured to minimize seat deformation of the static section 40 of the valve seat 20. This essentially eliminates differential motion between contact surfaces between the valve seat and body.

The concentration of the retention function in the static section 40 of the valve seat permits geometric tailoring and optimization of the dynamic section 42 of the valve seat and the corresponding surfaces on the body 12. When the diaphragm is in the open position, the dynamic section of the valve seat and the body define a body cavity relief space, and when the diaphragm is in the closed position, the dynamic section of the valve seat compresses to fill at least in part the body cavity relief space. In particular, as best seen in the closer view of FIG. 6, adjacent the dynamic section of the valve seat, the body 12 includes an inclined plane 50 rather than a straight surface that otherwise would contact the valve seat. The inclined plane 50 thus defines a body cavity relief space 52 that provides a clearance between the dynamic section of the valve seat and the body. In exemplary embodiments, the body cavity relief space 52 can alternatively or additionally be defined by a commensurate second inclined plane 54 formed by tapering the dynamic section 42 of the valve seat adjacent the valve body.

This addition of clearance between valve seat and valve body, provided by the tapering of the body surface at the inclined plane 50, and/or by the tapering of the valve seat surface at the inclined plane 54, further reduces wear of the valve seat. As referenced above, the force of the diaphragm when the valve is closed tends to compress the material of the valve seat adjacent the diaphragm. This compression is best depicted in FIG. 6, with the top of the dynamic section 42 being deformed as compared to the valve open position of FIG. 5. The clearance of the body cavity relief space 52 provides space at least in part for the material of the dynamic section 42 to fill under the referenced compression. Without the relief space, such as in conventional configurations, contact between the valve seat material compressed under the force of the diaphragm causes wear between the valve seat component and the valve body component, with the wear to the valve seat in particular potentially producing particulate debris, which is considered a failure in ultra high purity applications such as ALD processes. By providing the additional clearance of the cavity relief space 52 into which the dynamic section of the valve seat can compress, the wear associated with conventional configurations is avoided.

As also seen if FIGS. 4-6, in exemplary embodiments only one single diaphragm 24 is utilized. As referenced above, one factor contributing to valve failure is the repeated stress placed on the diaphragm when the valve is closed. In conventional multiple diaphragm configurations, this fatigue is accelerated when two or more diaphragms are used in a valve assembly, as the two diaphragms rub or fret against each other, accelerating the formation of fatigue cracks. The present invention avoids the wear or fatigue of diaphragm-to-diaphragm fretting by utilizing only one single diaphragm 24.

As also referenced above, fretting caused by rubbing between the diaphragm and the cap also contributes to fatigue failures. Referring again to FIGS. 4 and 5, the cap 26 has a contact surface 56 that comes into contact, at least in part, with the first or top surface 36 of the diaphragm 24. When the valve is in the open position, an increased portion of the top surface 36 comes into contact with the contact surface 56 of the cap 12, as the diaphragm releases from the valve seat. This repetitive contact/non-contact of surface portions of the diaphragm and cap, particularly at the associated high cycle speeds, leads to the fretting of the diaphragm.

To reduce such fretting, in exemplary embodiments the contact surface 56 of the cap 26 is provided with a thin coating or layer 58 of a dry film lubricant. The dry film lubricant layer 58 serves as a dry lubricant between the cap and the diaphragm, which substantially reduces the fretting and commensurately reduces the potential for fatigue crack formation. In exemplary embodiments, the dry film lubricant layer 58 is a thin layer or coating of silver plating, which may be applied by silver plating processes as are known in art. The lubricating effect of the sliver plating may be enhanced by applying the silver plating with only nickel strike before the silver plating, without also applying copper strike or matte undercoating as may be utilized in conventional plating processes. Removing conventional cooper strike and/or matte undercoating thus may enhance the dry lubrication properties of the silver plating. Other suitable dry film lubricants may be employed, such as, for example, various graphite and molybdenum based lubricants.

Collectively, therefore, the configuration of the valve seat 20 and related portions of the valve body 12 operate to substantially avoid the valve seat wear that contributes to valve failure in conventional configurations. First, the flange 44 and cooperating recess 46 retain the static section 40 of the valve seat to prevent valve seat wear of the static section. In addition, the body cavity relief space 52 defined by the inclined plane 54 and/or inclined plane 56 permit unrestricted compression of the dynamic section 42 of the valve seat to prevent valve seat wear of the dynamic section. The valve performance further is enhanced by the use of a single diaphragm in conjunction with a dry film lubricant, such as a silver plating layer, applied to the valve cap. This avoids additional wear or fretting of the diaphragm, which otherwise also contributes to valve failure in conventional configurations. With such enhancements, the HCS valve of the present invention has been shown to achieve an MTTF of approximately 40 million cycles, far above results achieved with conventional configurations.

In accordance with the above, aspects of the invention include a high cycle and speed valve. In exemplary embodiments, the high cycle and speed valve includes a body, a valve seat fixed within the body, and a diaphragm that moves between a closed position in which a first surface of the diaphragm is forced against the valve seat, and an open position in which the first surface of the diaphragm is released from the valve seat. The valve seat includes a static section that is secured within the body and a dynamic section that is compressed by the diaphragm when the diaphragm is in the closed position.

In an exemplary embodiment of the high cycle and speed valve, the static section of the valve seat includes a base and a flange that extends radially outward from the base, and the body has a recess that receives the flange to retain the static section of the valve seat within the body.

In an exemplary embodiment of the high cycle and speed valve, when the diaphragm is in the open position, the dynamic section of the valve seat and the body define a body cavity relief space, and when the diaphragm is in the closed position, the dynamic section of the valve seat compresses to fill at least in part the body cavity relief space.

In an exemplary embodiment of the high cycle and speed valve, at least one of the dynamic section of the valve seat or the body has an inclined plane that defines the body cavity relief space.

In an exemplary embodiment of the high cycle and speed valve, each of the dynamic section of the valve seat and the body has an inclined plane that define the body cavity relief space.

In an exemplary embodiment of the high cycle and speed valve, the valve further includes a cap that has a contact surface that contacts at least a portion of a second surface of the diaphragm opposite the first surface of the diaphragm, wherein the contact surface of the cap has a dry film lubricant layer that serves as a dry lubricant between the cap and the second surface of the diaphragm.

In an exemplary embodiment of the high cycle and speed valve, the dry film lubricant layer is a silver plating layer that is applied as a coating layer on the contact surface of the cap.

In an exemplary embodiment of the high cycle and speed valve, the silver plating layer is applied using a nickel strike.

In an exemplary embodiment of the high cycle and speed valve, the dry film lubricant is at least one of a graphite or molybdenum based coating.

In an exemplary embodiment of the high cycle and speed valve, the high cycle and speed valve has only one diaphragm.

In an exemplary embodiment of the high cycle and speed valve, the valve further includes an actuator element, and a button in contact with at least a portion of a second surface of the diaphragm opposite the first surface. The actuator operates to move the diaphragm into the closed position to close the valve by actuating the button to force the first surface of the diaphragm against the valve seat, and the actuator operates to permit the diaphragm to move into the open position to open the valve by actuating the button to permit release of the first surface of the diaphragm from the valve seat.

In an exemplary embodiment of the high cycle and speed valve, the actuator element is a pneumatic actuator.

In additional exemplary embodiments, the high cycle and speed valve includes a body, a valve seat fixed within the body, and a diaphragm that moves between a closed position in which a first surface of the diaphragm is forced against the valve seat, and an open position in which the first surface of the diaphragm is released from the valve seat. The valve further includes a cap that has a contact surface that contacts at least a portion of a second surface of the diaphragm opposite the first surface of the diaphragm, wherein the contact surface of the cap has a dry film lubricant layer that serves as a dry lubricant between the cap and the second surface of the diaphragm.

In an exemplary embodiment of the high cycle and speed valve, the dry film lubricant layer is a silver plating layer that is applied as a coating layer on the contact surface of the cap.

In an exemplary embodiment of the high cycle and speed valve, the silver plating layer is applied using a nickel strike.

In an exemplary embodiment of the high cycle and speed valve, the dry film lubricant is at least one of a graphite or molybdenum based coating.

In an exemplary embodiment of the high cycle and speed valve, the high cycle and speed valve has only one diaphragm.

In an exemplary embodiment of the high cycle and speed valve, the valve further includes an actuator element, and a button in contact with at least a portion of the second surface of the diaphragm. The actuator operates to move the diaphragm into the closed position to close the valve by actuating the button to force the first surface of the diaphragm against the valve seat, and the actuator operates to permit the diaphragm to move into the open position to open the valve by actuating the button to permit release of the first surface of the diaphragm from the valve seat.

In an exemplary embodiment of the high cycle and speed valve, the actuator element is a pneumatic actuator.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A high cycle and speed valve comprising:
   a body;
   a valve seat fixed within the body; and
   a diaphragm that moves between a closed position in which a first surface of the diaphragm is forced against the valve seat, and an open position in which the first surface of the diaphragm is released from the valve seat;
   wherein the valve seat comprises a static section that is rigidly and statically connected to the body and a dynamic section that is arranged adjacent to the static section in a region interposed between the static section and the diaphragm, and
   wherein a body cavity relief space is defined between inclined surfaces of the body and an outer part of the dynamic section in the region interposed between the static section and the diaphragm, the body cavity relief space being tapered from the diaphragm towards the static section when the diaphragm is in the open position, and the dynamic section being compressed by the diaphragm to fill at least in part the body cavity relief space when the diaphragm is in the closed position.

2. The high cycle and speed valve of claim 1, wherein the static section of the valve seat comprises a base and a flange that extends radially outward from the base;
   and the body has a recess that receives the flange to retain the static section of the valve seat within the body.

3. The high cycle and speed valve of claim 1, wherein at least one of the dynamic section of the valve seat or the body has an inclined plane that defines the body cavity relief space.

4. The high cycle and speed valve of claim 1, further comprising a cap that has a contact surface that contacts at least a portion of a second surface of the diaphragm opposite the first surface of the diaphragm;
   wherein the contact surface of the cap has a dry film lubricant layer that serves as a dry lubricant between the cap and the second surface of the diaphragm.

5. The high cycle and speed valve of claim 4, wherein the dry film lubricant layer is a silver plating layer that is applied as a coating layer on the contact surface of the cap.

6. The high cycle and speed valve of claim 4, wherein the dry film lubricant is at least one of a graphite or molybdenum based coating.

7. The high cycle and speed valve of claim 1, wherein the high cycle and speed valve has only one diaphragm.

8. The high cycle and speed valve of claim 1, further comprising:
   an actuator element; and
   a button in contact with at least a portion of a second surface of the diaphragm opposite the first surface;
   wherein the actuator operates to move the diaphragm into the closed position to close the valve by actuating the button to force the first surface of the diaphragm against the valve seat, and the actuator operates to permit the diaphragm to move into the open position to open the valve by actuating the button to permit release of the first surface of the diaphragm from the valve seat.

9. The high cycle and speed valve of claim 8, wherein the actuator element is a pneumatic actuator.

10. A high cycle and speed valve comprising:
    a body,
    a valve seat fixed within the body;
    a diaphragm that moves between a closed position in which a first surface of the diaphragm is forced against the valve seat, and an open position in which the first surface of the diaphragm is released from the valve seat, wherein the valve seat comprises a static section that is rigidly and statically connected to the body and a dynamic section that is arranged in a region that is bounded by the static section, the body, and the diaphragm, wherein a body cavity relief space is defined between inclined surfaces of the body and an outer part of the dynamic section within the region, the body cavity relief space being tapered from the diaphragm towards the static section when the diaphragm is in the open position, and the dynamic section being compressed by the diaphragm to fill at least in part the body cavity relief space when the diaphragm is in the closed position; and
    a cap that has a contact surface that contacts at least a portion of a second surface of the diaphragm opposite the first surface of the diaphragm;
    wherein the contact surface of the cap has a dry film lubricant layer that serves as a dry lubricant between the cap and the second surface of the diaphragm.

11. The high cycle and speed valve of claim 10, wherein the dry film lubricant layer is a silver plating layer that is applied as a coating layer on the contact surface of the cap.

12. The high cycle and speed valve of claim 10, wherein the dry film lubricant is at least one of a graphite or molybdenum based coating.

13. The high cycle and speed valve of claim 10, wherein the high cycle and speed valve has only one diaphragm.

14. The high cycle and speed valve of claim 10, further comprising:
    an actuator element; and
    a button in contact with at least a portion of the second surface of the diaphragm;
    wherein the actuator operates to move the diaphragm into the closed position to close the valve by actuating the button to force the first surface of the diaphragm against the valve seat, and the actuator operates to permit the diaphragm to move into the open position to open the valve by actuating the button to permit release of the first surface of the diaphragm from the valve seat.

15. The high cycle and speed valve of claim 14, wherein the actuator element is a pneumatic actuator.

* * * * *